Patented Aug. 30, 1938

2,128,635

UNITED STATES PATENT OFFICE 2,128,635

LAMINATED STRUCTURE AND METHOD FOR PREPARING SAME

William Hale Charch, Buffalo, N. Y., and Dorothy Bateman Maney, Old Hickory, Tenn., assignors, by mesne assignments, to E. I. du Pont de Nemours & Company, Wilmington, Del., a corporation of Delaware No Drawing. Application March 23, 1935, Serial No. 12,739

25 Claims. (Cl. 154—40)

This invention relates to coated structures, and more particularly it relates to structures having coatings, linings, laminations, and the like, of rubber, rubber substitutes, and synthetic rubbers, and methods for preparing same.

The use of rubber, substituted rubbers, synthetic rubbers, and the like, as coatings, linings and laminations, with other materials, has comparatively recently been found to materially enhance the value of such materials for various purposes and uses. Rubber or rubber-like substances are also extensively used for coating metals, alloys, glass, ceramics, paints, wood, and various kinds of cellulosic materials, such as fabrics for the production of rubberized materials.

Heretofore, in the production of materials having coatings, linings or laminations of rubber or the like, great difficulty has been experienced in forming a secure bond or adhesion between the rubber and the said materials, thus materially limiting the use and the efficiency of rubber or rubber-like coatings on various materials.

It is therefore an object of this invention to produce an article coated, lined or laminated with rubber having improved adhesion between the article and the rubber.

It is another object of this invention to provide a method for securing improved adhesion between rubber and materials which are to be coated, lined, or laminated with rubber.

It is a still further object of this invention to provide a method for securing improved adhesion between rubber and glass, ceramic articles, metals, alloys, wood, fabrics, paints, and their equivalent materials, by means of a substantially insoluble, infusible, synthetic resin associated therewith, preferably together with dispersed rubber or latex.

It is yet another object of this invention to provide a method for producing articles capable of greatly improved adhesion to rubber by reason of the presence on and/or in the article of a substantially insoluble, infusible, synthetic resin, and preferably also dispersed rubber or latex.

Other objects of the invention will appear hereinafter.

The objects of this invention are accomplished in general by associating with the articles or materials to be coated, lined, or laminated with rubber, certain heat-hardening synthetic resins, preferably together with dispersed rubber or latex, and then coating such articles or materials with rubber and vulcanizing the same, thereby securing an improved adhesion between the rubber and said articles or materials.

The term "rubber" unless otherwise modified, as used in the specification and claims, is intended to be used in its generic sense to include rubber substitutes, natural rubber, synthetic rubbers, and the like.

As articles or materials which may be treated to improve their adherence to rubber, the following may be mentioned; any metals, such as zinc, aluminum, nickel, chromium, iron, steel, lead, and their alloys, such as may be used in the construction of various articles of manufacture or which may otherwise be desired to be coated or laminated with rubber. Also cellulosic materials, such as wood, paper, cotton, regenerated cellulose, cellulose derivatives, and the like, may be coated for the protection thereof from corrosion or staining, or for waterproofing, and so forth. Rubber or rubber articles may be treated in accordance with the method of this invention to materially improve the adhesion of other substances and materials thereto, for example, paints, lacquers and varnishes of all kinds which may be desired to be used for the coating of rubber materials and articles, which, in their ordinary use, will chip or flake off from the rubber material, may be applied to the rubber articles or materials after treating the latter in accordance with the teaching of the invention. Other materials, which may be mentioned as being capable of treatment, to materially enhance the adhesion of rubber thereto, are ceramic materials, glass, leather, and in fact all commonly known materials and articles of manufacture which it may be desirable to coat, line or laminate with rubber. The invention has been found to be particularly applicable to coat rubber articles with a thin layer of an isoprene polymer, such as halogen-2-butadiene-1,3 polymer, for the purpose of rendering the former oil-proof, in which case, it is much preferred to use the resin in combination with dispersed rubber or latex, and a halogen-2-butadiene 1,3 polymer latex.

As the rubber which may be used for coating, lining or laminating the above-described materials, the invention contemplates any liquid, semi-solid or solid compound of natural rubber stock, or any compound of synthetic rubber stock, such as the isoprene or butadiene polymer, halogen-2-butadiene 1,3 polymer, e. g., chloro-2-butadiene 1,3 polymer, or diene polymers of other types. Moreover, the rubber may contain any desired vulcanizer, stabilizer, accelerator, and the like, singly or in any desired combination. In its preferred and common form, the invention contemplates any commercial, compounded rubber stock such as is commonly employed in the fabrication of metal tank linings, automobile tires, rubber hose, raincoat materials, shoes, belting such as conveyor belts, fan belts, or other driving belts, and the like.

The resins contemplated as being within the scope of this invention belong to the general class of heat-hardening aldehyde resins, preferably resins formed from phenolic compounds and aldehydes which are both water-soluble to the extent of ½ to 5% by weight. These resins should be capable of condensing, polymerizing or setting up rapidly and completely to a substantially insoluble, infusible form, with or without the presence of a catalyst or condensing agent, at temperatures of about 125° C. or less. The resins are made and applied to the articles to be coated from an aqueous solution.

As phenolic compounds possessing the above-mentioned qualifications and therefore particularly satisfactory for use in the operation of this invention may be mentioned the polyphenols and especially the polyphenols having the hydroxyl groups in the benzene nucleus meta with respect to one another, such as resorcinol, phloroglucinol and orcinol. A part of the polyphenol, for example 10 to 20 per cent, may be replaced with phenol or salicylic acid. The preferred concentration of phenolic compound is between 0.5 and 5 per cent by weight. It is understood that the invention is not limited to these specific phenols. Other phenols can, of course, be used by suitably modifying the conditions under which they are used. Phenols having a lower water-solubility, for example less than 1 or 2 per cent by weight, often may be conveniently employed in the form of aqueous dispersions and phenols which react rather slowly with formaldehyde or other aldehydes at the temperatures commonly used in this invention can often be caused partially to condense with the aldehyde before application to the article or material, thus lessening the time subsequently necessary for substantially complete polymerization or setting up.

Commonly, formaldehyde is the aldehyde used, but any aldehyde satisfying the foregoing qualifications as to water-solubility and time and temperature required for complete polymerization or setting up with the phenolic compound in question to a substantially insoluble, infusible resin is contemplated by this invention. For example, acetaldehyde or furfural may in some cases be substituted for formaldehyde either wholly or in part. Moreover, modifications in the method of procedure, such as have been discussed in connection with the choice of phenolic compound, may make possible the use of still other aldehydes which would not commonly be suitable because of low water-solubility or slowness in condensing and polymerizing completely with the phenolic compound to a substantially insoluble, infusible resin. The aldehyde is used preferably in some excess of that theoretically required per mol of phenol in order to insure condensation of all the phenol present. If too little aldehyde be used, there is danger of some part of the phenolic compound present in the treating solution being left unreacted, in which case it may subsequently at least partially react with or counteract the effect of the accelerator present in the compounded rubber stock to which the cord is to be adhered and thus result in incomplete curing and poor adhesion.

If desirable, the time or temperature, or both, of drying the material after passage through the aqueous solution of resin-forming materials, or the time or temperature, or both, of curing or vulcanization may be varied from those ordinarily used in manufacturing rubber hose, rubberized fabrics, belts and the like, in order to insure complete condensation and polymerization of less readily reactive phenol-aldehyde combinations. However, as has been indicated, it is easily possible according to this invention and usually preferable to select for use in improving adhesion, phenols and aldehydes which can be satisfactorily applied to current commercial processes without necessitating any essential changes in procedure.

Usually it is desirable to add to the aqueous solution of resin-forming materials containing essentially a phenolic compound and an aldehyde, a small amount of catalyst or condensing agent for the resinification reaction. We prefer catalysts or condensing agents which are basic in nature. Of these, sodium hydroxide is most commonly employed and may be added in any desired amount according to the special character of the solution in which it is to be used although amounts are preferred between 0.02 per cent and 0.8 per cent by weight. When the resin is used in combination with latex, the amount of sodium hydroxide employed as a condensing agent should preferably be from 0.15% to 0.30% by weight. The amount of alkaline catalyst may be more specifically determined by the pH required or desired in the solution of resin-forming materials and dispersed rubber or latex. It may be desirable to adjust the pH of the resin solution so that it will be approximately the same as the pH of the dispersed rubber or latex solution in which it is used. Thus the amount of alkaline catalyst which is used may be determined by the amount required to bring the pH of the solution to some predetermined value, as for instance 8.5 to 9. Instead of sodium hydroxide, potassium hydroxide may of course be used, or any other suitable alkaline condensing agent.

Various articles and materials may be treated with aqueous solutions of resin-forming material, as has been described, with subsequent polymerization or setting up of these materials into a substantially insoluble, infusible resin on and/or in the materials being treated to greatly improve the adhesion of said materials to rubber. It is nevertheless preferred, according to this invention, to employ the treatment with an aqueous solution of resin-forming material in combination with a rubber or latex treatment, as giving still more marked improvement in adhesion. This may be accomplished in a number of ways, the simplest and most convenient of which contemplates the combination of aqueous dispersions of rubber or latex, whether artificial, natural, vulcanized or compounded, with the aqueous solution of resin-forming material before application to the material.

The latex or rubber may be present in the solution for treating the material in any desired proportion, although commonly the improvement in adhesion is most marked when such concentrations of rubber or latex are used that the percentage of rubber solids in the solution is between 5 and 40% by weight, and preferably between 8 and 20% by weight. If a natural latex dispersion is used it may be either crude latex, creamed latex, that is, a latex from which certain soluble materials such as sugars, acids, soluble resins, soluble proteins, et cetera, have been removed, or one which contains added materials, or one which has been treated to change the character of the rubber in it, for instance by degradation or oxidation, or both. For instance, it may contain any desired accelerators, vulcanizers, stabilizers, dispersing agents, or any other substances such as are commonly employed in the rubber industry. When rubber is used as an artificial dispersion in water of either natural rubber or of any known synthetic rubber, it may likewise contain additionally such substances as rubber accelerators, vulcanizers, stabilizers, dispersing agents, and the like. The thread-treating composition may also contain other materials such as casein, glutinous materials, water-soluble adhesives, wetting agents, and the like, which may be added as adhesives, stabilizers or for a variety of purposes without departing from the fundamental principle of this invention.

This invention also contemplates, as a method for improving the adhesion of rubber to the said articles, the step of treating the article with an aqueous solution of resin-forming material such as above disclosed, subsequently drying the article at elevated temperatures sufficient to cause the formation of a substantially insoluble, infusible resin, for example, temperatures of 80–125° C., or higher, and then treating the resulting resin-coated article with a solution of rubber and toluol or other suitable solvent for rubber, and removing said solvent by evaporation so that the article finally has a coating of resin and thereover a coating of rubber. The rubber solution may be a solution of either natural or synthetic rubber and may be either of crude, raw rubber, or of rubber compounded with any one of several of a variety of accelerators, vulcanizers, stabilizers, and the like, which are commonly added to rubber, or of rubber depolymerized, oxidized, or otherwise modified.

Alternatively, the article may be treated first with the aqueous solution of resin-forming material consisting of a phenolic compound, an aldehyde, and preferably a catalyst or condensing agent, and then with an aqueous solution of the resin-forming materials in the same or different concentration, to which dispersed rubber or latex also has been added. Moreover, the article may be given still further treatment with this same solution of resin-forming materials containing dispersed rubber or latex, or with different solutions in which, for example, the concentration of resin-forming materials is successively decreased, and that of the rubber or latex successively increased, or in which the concentration of resin-forming materials is the same in each case, but that of the dispersed rubber or latex is successively increased, or in which the chemically dissimilar resin-forming materials are dissolved. In accordance with the preferred method of operation of this invention, after each aqueous treatment, the article is dried before application of the next successive treatment.

The nature of the successive treatments or their order of succession may be varied, depending upon the purpose in view. Furthermore, the individual treatments or the materials with which the articles or materials are treated may be varied depending upon the temperatures to which the material to be coated may be subjected. For example, in coating yarns or fabrics containing cellulose derivatives, such as cellulose acetate, and other cellulose esters and ethers which may be thermoplastic at somewhat elevated temperatures, the resin-forming materials and the various steps of treatment to form such resinous coating, and the step of applying the rubber coating to the resin-coated article must be carried out at low temperatures so that the filaments or fabrics will not be impaired by the treating or coating process.

The adhesion between rubber and various articles to which it may be applied and which have been treated in accordance with this invention is improved to such a remarkable degree that after curing of the rubber the adhesion between the rubber and the article is many times, such as 5, 10 or 25 times or in certain cases even more than that between untreated articles and rubber. The process, in accordance with this invention, is also believed to be particularly advantageous in view of the fact that many variations and modifications thereof may be used to adapt the process to articles of a materially different nature.

This invention eliminates the use of solvent cements which are inflammable and dangerous to use because of fire hazard and toxicity; furthermore, the elimination of solvent cement involves a very material saving in the process. This advantage of the present invention is particularly important in the lining of tanks or closed containers where the use of solvent cements is extremely dangerous.

Another advantage of the present invention over previously known processes for the adhesion of rubber to various materials is that the joint between the rubber and other materials is not thermoplastic and will adhere tenaciously at elevated temperatures. Rubber coverings or linings may be used in numerous instances where they are subjected to a fairly high temperature, for example, motor or fan belts, or conveyor belts for the handling of hot materials. It may be desirable to use rubber lined tanks for handling hot materials and it is consequently important that the joint between the rubber and the metal or other material which is being covered is tight, even when at an elevated temperature.

The joint between rubber and other materials, when joined in accordance with this invention, will be waterproof, and such water as may come into contact with the adhesive will have little or no effect thereon.

In order to more clearly set forth the principles of this invention, the following examples are given. It is of course to be understood that the invention is not to be limited to the specific details of the examples which are merely illustrative in nature.

*Example I*

An aqueous solution is made up containing 4% by weight of resorcinol, 3.2% by weight of formaldehyde (added as 2½ times that amount of commercial 40% formaldehyde) and 0.16% by weight of sodium hydroxide. After being allowed to stand for 12 to 18 hours at room temperature, or long enough to permit an initial condensation to take place between the resorcinol and formaldehyde, the solution is combined, with stirring, with an equal weight of aqueous crude natural rubber latex dispersion containing 40% rubber solids and with sufficient additional sodium hydroxide to bring the final concentration to 0.22% by weight of the total solution which now contains 2% by weight of resorcinol, 1.6% by weight of formaldehyde and 20% by weight of dispersed rubber solids.

The internal surface of a steel tank is coated with the above resin-latex mixture by spraying, brushing, flowing or any other desired method and permitted to dry to at least partially polymerize the resin. It is preferred to dry at room temperature but if desired the coated tank may be heated to more rapidly dry the coating. A liquid compounded natural rubber stock containing a suitable vulcanizer and/or accelerator, such as is well known in the arts, is applied over the dried resin-latex coating. The plate is then subjected to a vulcanizing temperature for such a period of time as to completely cure the rubber. The resulting coating of rubber adheres very firmly to the plate so that it can be removed only with difficulty.

Example II

An aqueous solution is made up containing 2% by weight of resorcinol, 1.2% formaldehyde (added as 2½ times that amount of commercial 40% formaldehyde), 0.2% by weight of sodium hydroxide and 10% by weight of rubber solids in the form of dispersed natural rubber latex containing vulcanizers and accelerators. Fabric, paper, leather, or the like, is treated, for instance, by passing through this composition the fabric, paper, leather, or the like, and then between squeeze rolls to remove the excess solution, or the composition may be applied by means of transfer rolls or in any other suitable manner. The impregnated fabric, or the like, is dried in any suitable manner either at room temperature or by passing it through a tunnel drier or over a plurality of rolls heated to 80° to 100° C. A rubber coating is then applied to the base sheet by calendering in the usual manner and vulcanized. The rubber coating adheres tenaciously to the base sheet.

Example III

An aqueous composition is prepared containing the following ingredients given in per cent by weight based on the total solution:

| | Per cent |
|---|---|
| Resorcinol | 2 |
| Formaldehyde (40% solution) | 4 |
| NaOH | 0.2 |
| Rubber solids in the form of natural latex containing a suitable vulcanizer and accelerator | 7.5 |
| Synthetic rubber solids in the form of an aqueous latex of chloro-2-butadiene 1,3 polymer | 7.5 |

It is prepared by mixing equal parts of the composition described in Example II and a composition similar to that described in Example II except that the 15% rubber solids in the form of natural latex is replaced by 15% rubber solids in the form of an aqueous latex of chloro-2-butadiene 1,3 polymer. This composition is especially useful for adhering halogen butadiene polymers such as chloro-2-butadiene 1,3 polymer to rubber or adhering such a chloro-2-butadiene 1,3 polymer to metals, alloys, wood, ceramics, glass, cellulosic materials, or the like.

Rubber hose may be lined with chloro-2-butadiene 1,3 polymer by passing a quantity of the above composition through the hose to thoroughly contact the entire internal surface therewith, after which it is permitted to dry either at room temperature or at an elevated temperature, such as 60–100° C. A dispersion of chloro-2-butadiene 1,3 polymer is then passed through the hose to completely cover the inner wall thereof with a thin coating. Thereafter, it is dried.

The resulting hose is particularly adaptable for use in conducting hydrocarbon fluids without marked deterioration even after long usage.

Example IV

An aqueous solution is prepared containing 2% by weight of resorcinol, 3% by weight of formaldehyde and 0.04% by weight of sodium hydroxide. This composition may be found useful for bonding rubber to various materials such as wood, leather, cellulosic structures, resinous products, and the like.

Example V

An aqueous solution is prepared containing 1% by weight of phloroglucinol, 2.5% by weight of formaldehyde, 0.2% by weight of sodium hydroxide and 10% by weight of rubber solids in the form of compounded natural latex. This composition will set up at room temperatures and is especially useful for sticking rubber coatings to materials that soften or melt at a relatively low temperature. For instance, moulded objects of cellulosic derivatives such as cellulose acetate may be coated with the above composition which is dried at room temperature or slightly elevated temperatures and thereafter covered with a coating of compounded rubber stock that can be vulcanized at relatively low temperatures.

Example VI

An aqueous solution is prepared containing 2% by weight of resorcinol, 5% by weight of furfural, 0.2% by weight of sodium hydroxide and 15% by weight of rubber solids in the form of natural latex. The composition is prepared and applied to various articles in the manner described under Examples I and II.

While it is generally preferred to coat the base with the adhesion compositions hereinbefore described, under certain conditions it may be desired to coat the rubber or to apply the coating to both the base and the rubber.

Since it is obvious that various changes and modifications may be made in the above description without departing from the nature and spirit of the invention, it is to be understood that the invention is not to be limited thereto except as set forth in the appended claims.

We claim:

1. A new article of manufacture comprising a base, said base having rubber adhering thereto, and a substantially insoluble, infusible synthetic resin, resulting from the condensation and polymerization of a polyhydric phenol and an aldehyde and applied from an aqueous medium, between said rubber and said base.

2. A new article of manufacture comprising a base, said base having rubber adhering thereto, and a substantially insoluble, infusible synthetic resin, resulting from the condensation and polymerization of a dihydric phenol and an aldehyde and applied from an aqueous medium, between said rubber and said base.

3. A new article of manufacture comprising a base, said base having rubber adhering thereto, and a substantially insoluble, infusible synthetic resin, resulting from the condensation and polymerization of a dihydric phenol and formaldehyde and applied from an aqueous medium, between said rubber and said base.

4. A new article of manufacture comprising a base, said base having rubber adhering thereto, and a substantially insoluble, infusible synthetic resin, resulting from the condensation and polymerization of resorcinol and an aldehyde and applied from an aqueous medium, between said rubber and said base.

5. A new article of manufacture comprising a base, said base having rubber adhering thereto, and a substantially insoluble, infusible synthetic resin, resulting from the condensation and polymerization of resorcinol and formaldehyde and applied from an aqueous medium, between said rubber and said base.

6. A new article of manufacture comprising a base, said base having rubber adhering thereto, and a substantially insoluble, infusible synthetic resin, resulting from the condensation and polymerization of resorcinol and formaldehyde in the presence of an alkaline catalyst and applied from an aqueous medium, between said rubber and said base.

7. A new article of manufacture comprising a base, said base having rubber adhering thereto, and a substantially insoluble, infusible synthetic resin resulting from the condensation and polymerization of a polyhydric phenol and an aldehyde, together with rubber, said resin and said rubber being applied from an aqueous medium between said rubber and said base.

8. A new article of manufacture comprising a base, said base having rubber adhering thereto, and a substantially insoluble, infusible synthetic resin resulting from the condensation and polymerization of a dihydric phenol and an aldehyde, together with rubber, said resin and said rubber being applied from an aqueous medium between said rubber and said base.

9. A new article of manufacture comprising a base, said base having rubber adhering thereto, and a substantially insoluble, infusible synthetic resin resulting from the condensation and polymerization of a dihydric phenol and formaldehyde, together with rubber, said resin and said rubber being applied from an aqueous medium between said rubber and said base.

10. A new article of manufacture comprising a base, said base having rubber adhering thereto, and a substantially insoluble, infusible synthetic resin resulting from the condensation and polymerization of resorcinol and formaldehyde in the presence of an alkaline catalyst, together with rubber, said resin and said rubber being applied from an aqueous medium between said rubber and said base.

11. A new article of manufacture comprising a base, said base having rubber adhering thereto, and a substantially insoluble, infusible synthetic resin resulting from the condensation and polymerization of resorcinol and formaldehyde in the presence of an alkali metal hydroxide, together with rubber, said resin and said rubber being applied from an aqueous medium between said rubber and said base.

12. In a method for improving the adhesion between materials comprising a base and rubber, the steps comprising treating one of said materials with an aqueous solution containing a member of the class consisting of (a) a mixture of a polyhydric phenol and an aldehyde, and (b) a polyhydric phenol and an aldehyde in partially condensed form, and subsequently treating to cause condensation and polymerization to form a substantially insoluble, infusible resin, and associating said base and said rubber so as to secure its tenacious adhesion by the bonding of the meeting faces with the resin.

13. In a method for improving the adhesion between materials comprising a base and rubber, the steps comprising treating one of said materials with an aqueous solution containing a catalyst and a member of the class consisting of (a) a mixture of a polyhydric phenol and an aldehyde, and (b) a polyhydric phenol and an aldehyde in partially condensed form, and subsequently condensing and polymerizing the said polyhydric phenol-aldehyde combination in situ to a substantially insoluble, infusible resin, and associating said base and said rubber so as to secure its tenacious adhesion by the bonding of the meeting faces with the resin.

14. In a method for improving the adhesion between materials comprising a base and rubber, the steps comprising treating one of said materials with an aqueous solution containing a member of the class consisting of (a) a mixture of a dihydric phenol and an aldehyde, and (b) a dihydric phenol and an aldehyde in partially condensed form, a catalyst, and dispersed rubber, and subsequently condensing and polymerizing said dihydric phenol-aldehyde combination in situ to a substantially insoluble, infusible resin, and associating said base and said rubber so as to secure its tenacious adhesion by the bonding of the meeting faces with the resin.

15. In a method for improving the adhesion between materials comprising a base and rubber, the steps comprising treating one of said materials with an aqueous solution containing a member of the class consisting of (a) a mixture of resorcinol and formaldehyde, and (b) resorcinol and an aldehyde in partially condensed form, a catalyst, and dispersed rubber, and subsequently condensing and polymerizing the resorcinol-formaldehyde combination in situ to a substantially insoluble, infusible resin, and associating said base and said rubber so as to secure its tenacious adhesion by the bonding of the meeting faces with the resin.

16. In a method for improving the adhesion between materials comprising a base and rubber, the steps comprising treating said base with an aqueous solution containing a member of the class consisting of (a) a mixture of a polyhydric phenol and an aldehyde, and (b) a polyhydric phenol and an aldehyde in partially condensed form, drying, and subsequently treating the resulting resin-containing base with a solution of rubber in an organic solvent, and removing the solvent by evaporation.

17. In a method for improving the adhesion between materials comprising a base and rubber, the steps comprising treating one of said materials with an aqueous solution containing dispersed rubber, containing a member of the class consisting of (a) a mixture of a polyhydric phenol and an aldehyde, and (b) a polyhydric phenol and an aldehyde in partially condensed form, and a catalyst, applying the material so treated to the other material, and vulcanizing the rubber.

18. A new article of manufacture comprising a base, a layer of halogen-2-butadiene-1,3 polymer on said base, and a substantially insoluble, infusible synthetic resin resulting from the condensation and polymerization of a polyhydric phenol and an aldehyde and applied from an aqueous medium between said base and said polymer.

19. A new article of manufacture comprising a base, a layer of chloro-2-butadiene-1,3 polymer on said base, and a substantially insoluble, infusible synthetic resin resulting from the condensation and polymerization of a polyhydric phenol and an aldehyde and applied from an aqueous medium between said base and said polymer.

20. A new article of manufacture comprising rubber, a layer of chloro-2-butadiene-1,3 polymer on said rubber, and a substantially insoluble, infusible synthetic resin resulting from the condensation and polymerization of a polyhydric phenol and an aldehyde and applied from an aqueous medium between said rubber and said polymer.

21. The article described in claim 20 characterized in that said layer is applied in association with dispersed rubber and dispersed chloro-2-butadiene-1,3 polymer.

22. A new article of manufacture comprising a metal base, said base having rubber adhering thereto, and a substantially insoluble, infusible synthetic resin resulting from the condensation and polymerization of a polyhydric phenol and an aldehyde and applied from an aqueous medium, between said rubber and said base.

23. A new article of manufacture comprising a metal base, said base having rubber adhering thereto, and a composition comprising rubber and a substantially insoluble, infusible synthetic resin resulting from the condensation and polymerization of a polyhydric phenol and an aldehyde and applied from an aqueous medium, between said rubber and said base.

24. A method for improving the adhesion between materials comprising metal and rubber comprising imposing on one of the materials an aqueous solution containing a member of the class consisting of (a) a mixture of a polyhydric phenol and an aldehyde, and (b) a polyhydric phenol and an aldehyde in partially condensed form, then applying the material so treated to the other material.

25. A method for improving the adhesion between materials comprising metal and rubber comprising imposing on one of the materials an aqueous solution containing a member of the class consisting of (a) a mixture of a polyhydric phenol and an aldehyde, and (b) a polyhydric phenol and an aldehyde in partially condensed form, together with rubber latex, then applying the material so treated to the other material.

WILLIAM HALE CHARCH.
DOROTHY BATEMAN MANEY.